O. H. & A. F. PIEPER.
ELECTRIC MOTOR.
APPLICATION FILED JUNE 21, 1909.
932,896.
Patented Aug. 31, 1909.
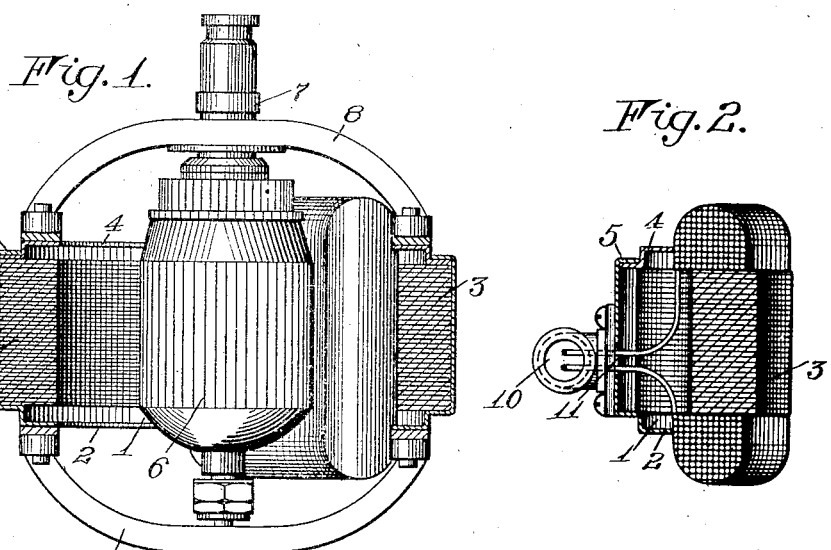
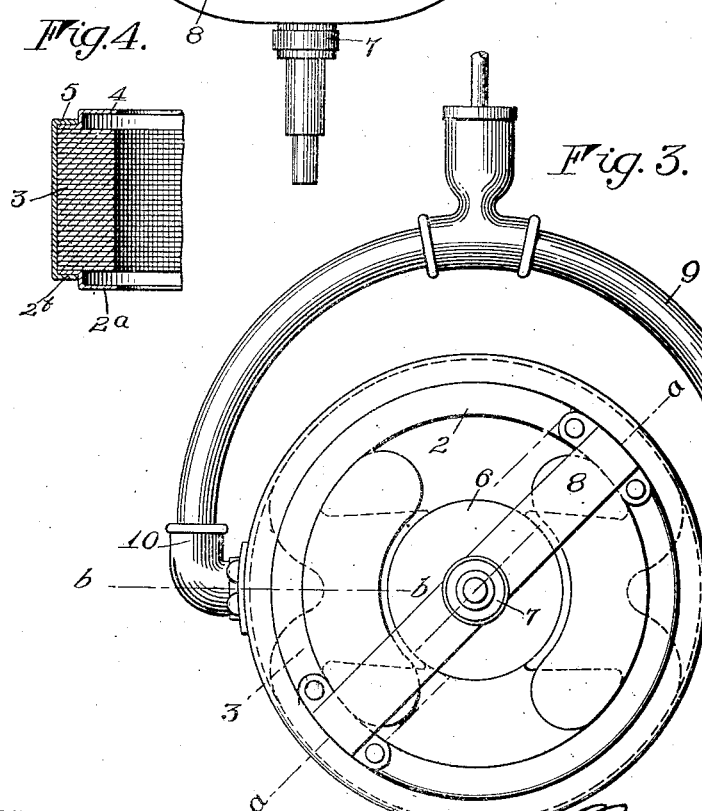
Witnesses
Inventors

UNITED STATES PATENT OFFICE.

OSCAR H. PIEPER AND ALPHONSE F. PIEPER, OF ROCHESTER, NEW YORK.

ELECTRIC MOTOR.

932,896.  Specification of Letters Patent.  Patented Aug. 31, 1909.

Application filed June 21, 1909. Serial No. 503,402.

*To all whom it may concern:*

Be it known that we, OSCAR H. PIEPER and ALPHONSE F. PIEPER, of Rochester, in the county of Monroe and State of New York, have invented certain new and useful Improvements in Electric Motors or Generators; and I do hereby declare the following to be a full, clear, and exact description of the same, reference being had to the accompanying drawings, forming a part of this specification, and to the reference-numerals marked thereon.

The present invention relates to electric motors and generators and it has for an object to provide a construction in which the members of a laminated field may be secured and held together firmly without being perforated.

To this and other ends the invention consists in certain improvements and combinations of parts all as will be hereinafter more fully described, the novel features being pointed out in the claims at the end of the specification.

In the drawings: Figure 1 is a sectional view of an electric motor constructed in accordance with this invention; Fig. 2 is a detail sectional view; Fig. 3 is a side view, *a—a* indicating the line on which Fig. 1 is taken, and *b—b* indicating the line on which Fig. 2 is taken, and Fig. 4 is a detail sectional view of a modification of the invention.

Electric motor and electric generator fields are often formed of a plurality of plates or disks united by passing bolts or tie members through perforations therein. These tie bolts reduce the efficiency of the motor or generator either by generating eddy currents when insulated or acting as the secondary of a transformer when uninsulated. In this invention the field plates or disks are secured together in such a manner that the perforation of the field and the use of tie bolts is not necessary, making it possible to increase the efficiency of the motor or generator and at the same time lessen the cost of manufacture thereof.

The invention is herein illustrated as embodied in a dental motor and employs, in Figs. 1 to 3, a casing or hollow drum 1 which is preferably made from flat stock and drawn or pressed into cylindrical shape with an inwardly turned annular flange or retaining device 2 at one end. Arranged within this drum is the field formed of a plurality of plates or disks 3 and held at one side of the flange 2. At the opposite side, the field is held by a retaining ring 4 which fits within the drum and is secured in position therein by bending or turning inwardly the edge 5 of the drum.

In assembling the parts the field plates and retaining ring are fitted within the drum and pressed toward the flange 2. When a sufficient compression has been obtained the edge 5 is bent inwardly to engage the retaining ring 4 in order to hold the disks 3 and ring 4 under compression within the drum.

The armature 6 may be supported in bearings 7 and are carried by brackets or supports 8 bolted or otherwise secured to the flange 2 and the retaining ring 4; while the motor is supported by an inverted yoked frame 9 whose arms are attached to the drum by elbows 10. The conductors lead through the frame and the elbows and connect with the motor after passing through perforations 11 in opposite sides of the drum.

Instead of forming the retaining device 2 integral with the hollow drum it may be formed by a separate ring 2$^a$ held by bending inwardly the end of the drum to form a flange 2$^b$ (see Fig. 4). Of course, this retaining device may be utilized to hold one of the supports 8.

A motor or generator constructed in accordance with this invention is inexpensive to manufacture as the parts may be assembled very quickly and the number of operations in manufacturing is reduced. It is not necessary to perforate the field and employ tie bolts and consequently greater efficiency in the operation of the motor or generator is obtained.

We claim as our invention:

1. A motor or generator comprising a casing having a retaining device at one end, a field formed of disks fitted in the casing and held at one side by the retaining device, and a retaining ring coöperating with the opposite side of the field, the end of the casing opposite the retaining device being bent inwardly into engagement with the retaining ring to hold the latter and the field within the casing.

2. An electric motor or generator comprising a casing having a retaining device at one end, a field formed of disks compressed in the casing against said retaining device, and a field retaining ring also compressed within said casing at the opposite end of the latter, the metal of the said casing being bent into engagement with the ring to hold the latter and the field within the casing under compression.

3. An electric motor or generator comprising a casing having a retaining device at one end, a field formed of a plurality of disks and held at one side by the retaining device, a retaining ring holding the other side of the field and fitted in the casing, the end of the latter opposite the retaining device being bent inwardly to retain the ring within the casing, and armature bearing supports secured to the retaining device and to the retaining ring.

OSCAR H. PIEPER.
ALPHONSE F. PIEPER.

Witnesses:
RUSSELL B. GRIFFITH,
HAROLD H. SIMMS.